United States Patent
Seibert (10) Patent No.: US 9,835,452 B2
(45) Date of Patent: Dec. 5, 2017

(54) HIDEOUT UTILITY TEST STATION AND MARKER

(71) Applicant: Rhino Marking & Protection Systems, Minneapolis, MN (US)

(72) Inventor: Nick Seibert, Lakeville, MN (US)

(73) Assignee: Rhino Marking & Protection Systems, Minneapolis, MN (US)

( * ) Notice: Subject to any disclaimer, the term of this patent is extended or adjusted under 35 U.S.C. 154(b) by 383 days.

(21) Appl. No.: 14/173,666

(22) Filed: Feb. 5, 2014

(65) Prior Publication Data

US 2014/0216328 A1    Aug. 7, 2014

Related U.S. Application Data (60) Provisional application No. 61/761,043, filed on Feb. 5, 2013.

(51) Int. Cl.
  *G01C 15/04*    (2006.01)

(52) U.S. Cl.
  CPC .................... *G01C 15/04* (2013.01)

(58) Field of Classification Search
  CPC ........... E01F 9/019; E01F 9/646; E01F 9/685; G01C 15/04; A63C 19/062
  USPC ...... 292/197; 215/353, 386, 393; 206/459.1, 206/459.5
  See application file for complete search history.

(56) References Cited

U.S. PATENT DOCUMENTS

| | | | | |
|---|---|---|---|---|
| 5,234,236 A | * | 8/1993 | Gromotka | E05B 63/0056 292/194 |
| 5,529,429 A | * | 6/1996 | Pelegrin | E01F 9/646 116/63 C |
| 6,494,636 B1 | * | 12/2002 | Mozena | A63C 11/221 403/109.2 |
| 7,025,016 B1 | * | 4/2006 | Landes | E04H 12/223 116/209 |
| 2005/0242592 A1 | * | 11/2005 | Watts | E05B 15/0205 292/95 |
| 2010/0077954 A1 | * | 4/2010 | Eigel | F16L 1/11 116/209 |

OTHER PUBLICATIONS

Non-Patent Literature The Rhino Test Station, accessed at http://web.archive.org/web/20110910213219/http://www.rhinomarkers.com/DP_Products/product_page.php?id=TVTEST, archived on Sep. 10, 2011.*

Non-Patent Literature Rhino Soilmarker, accessed at http://web.archive.org/web/20101218144452/http://rhinomarkers.com/DP_Doco/FACT/SOIL_FACT.pdf, archived on Dec. 18, 2010.*

* cited by examiner

*Primary Examiner* — Daniel S Larkin
*Assistant Examiner* — Irving A Campbell
(74) *Attorney, Agent, or Firm* — Patterson Thuente Pedersen, P.A.

(57) ABSTRACT

The post system of the present invention is formed from a cap and a base. The cap sits flush with the ground while the base system extends into the ground towards the underground hazard. The cap is removable to access a tracer station or similarly-mounted integrated steel plate. The cap includes a superior disk, a cap housing, and a locking mechanism. The base includes an anchor system and two telescoping assemblies nested within the base so as to raise the test station or steel plate above ground level.

10 Claims, 8 Drawing Sheets

HIDEOUT UTILITY TEST STATION AND MARKER

RELATED APPLICATION

The present application claims the benefit of U.S. Provisional Application No. 61/761,043, filed Feb. 5, 2013 entitled "HIDEOUT UTILITY TEST STATION AND MARKER," which is incorporated herein in its entirety by reference.

FIELD OF THE INVENTION

The invention relates generally to marker posts and more specifically to a marker post disposed below the ground with a top metal plate that is easily locatable, and a removable cap that provides access to a tracer station.

BACKGROUND OF THE INVENTION

Traditionally, marker posts are used to place as an above the ground warning that an underground pipe or electric line is buried in the soil. The marker post must be somewhat visually and physically unobtrusive, yet be able to warn a person that an underground utility exists at the particularly marked location. In addition, the marker post must be able to withstand the environment for an extended period of time. The marker post should also be able to remain embedded at the location of the underground utility in order to continue to convey a warning message of the existence of an underground hazard to those who may be in the proximity of the underground hazard.

One problem with traditional marker posts is that once embedded, those marker posts stand a good chance of being up-lifted due to a variety of reasons such as by individuals who are in the proximity of the marker post or by nature, such as due to severely windy storms. In addition there is a need for a marker that contains a tracer or test station.

SUMMARY OF THE INVENTION

The invention substantially addresses the aforementioned needs of the industry. The post system of the present invention is formed from a cap and a base. The cap sits flush with the ground while base system extends into the ground towards the underground hazard. The cap is removable to access a tracer station or similarly-mounted integrated steel plate. The cap includes a superior disk, a cap housing, and a locking mechanism. The base includes an anchor system and two telescoping assemblies nested within the base so as to raise the test station or steel plate above ground level.

The superior disk includes a top surface, a bottom surface, a lip, a first aperture, and second apertures. It should be understood that the superior disk can be customized, as required by application, including shape, or thickness. The superior disk can embody a circular, oval, or other closed curve shape. The superior disk can embody a triangular, square, or other polygonal shape. The superior disk can embody a variety of profiles including flat, concavo-convex, a convex-convex, or a concavo-concave shape. In addition, the top surface of the superior disk can be customized to include proper labeling for applications including but not limited to use of the post system with water, gas, and fiber optic utilities. The first aperture of the superior disk can be used for operably coupling the locking mechanism. The second apertures of the superior disk can be used for operably coupling the superior cap to the receiving disk.

The cap housing includes a receiving disk and a casing. The receiving disk includes a first aperture and second apertures. It should be understood that the receiving disk can be customized, as required, including, shape or thickness. The receiving disk can embody a circular, oval, or other closed curve shape. The receiving disk can embody a triangular, square, or other polygonal shape. The receiving disk can embody a variety of profiles including flat, concavo-convex, a convex-convex, or a concavo-concave shape. The first aperture of the receiving disk can be used for operably coupling the locking mechanism. The second apertures of the receiving disk can be used for operably coupling the receiving disk to the superior disk. The casing may be customized to embody a closed curve, or polygon tube structure.

It is further envisioned that the receiving disk and the superior disk could be a singular unit disk molded on to the casing unit. A warning label could then be affixed to the uppermost surface of the disk.

The locking mechanism includes a bolt and a locking assembly. It should be understood that the locking assembly can be customized as required depending upon application. The bolt of the locking mechanism may be any standard bolt suitable for use with the cap of the post system. The locking assembly can include a first washer, a first nut, a second washer, a locking arm, and a final nut. In assembly the cap of the bolt rests upon the top surface of the superior disk, with the thread portion of the bolt extended downward into the casing. The washers, nuts, and locking arm may then be assembled onto the bolt.

The base includes a base housing, an anchor, a first internal telescoping arm, and a second internal telescoping arm. The base housing, first internal telescoping arm, and second internal telescoping arm may be customized, as required by application, to embody a closed curve, or polygon tube structure. The cap fits about the top end of the base unit thus sealing off the interior passage of the base from the elements.

The base housing includes a lower internal stop, anchoring wings, and an aperture. The lower internal stop acts as a catch or safety that prevents the internal telescoping arms from sliding out of the bottom of the housing. The base housing may include an upper internal lip or stop that acts as a catch or safety that prevents the internal telescoping arms from sliding out of the top of the housing. The anchoring wings act as a security feature for the post system. In use the anchoring wings are hinged to the housing at the bottom of the wing and extend outward from the housing. When the housing is pulled upwards the anchoring wings engage the surrounding environment and prevent removal of the post system. It should be understood that the anchoring wings may be of any shape or form as the application may require. The aperture of the base housing allows the locking arm of the locking mechanism to pass through the base thereby securing the cap to the base.

The first internal telescoping arm include may include a lower internal stop, a lower external lip, and an upper internal lip. The lower internal stop acts as a catch or safety that prevents the second internal telescoping arms from sliding out of the bottom of the housing. Alternatively, the base housing lower internal stop may act as a catch of safety for the second internal telescoping arm as well. There may also be a lower external lip that acts as a catch or safety that prevents the internal telescoping arms from sliding out of the top of the housing. The upper internal lip acts as a catch or safety that prevents the second internal telescoping arm from sliding out of the top of the housing.

The first internal telescoping arm may be of two piece construction having a first element with a smaller perimeter than the second element, i.e. in a wedding cake design. Conversely, the first internal telescoping arm may be a single molded piece.

The second internal telescoping arm sits within the first internal telescoping arm. The second internal telescoping arm includes a terminal board and anchoring holes. It may also include a lower external lip that acts as a catch or safety that prevents the internal telescoping arms from sliding out of the top of the housing. The terminal or tracer board functions as a location where the user may anchor, as an example, tracer wires for underground utilities by way of the anchoring holes.

In use, the post system described herein allows the user access to the tracer lines of underground utilities for testing continuity and integrity of the utilities. The cap is removed by loosening a fastener which rotates the lock mechanism. The cap is then removed from the housing. The tracer board or steel plate can be lifted axially from the housing due to the telescoping arms.

BRIEF DESCRIPTION OF THE DRAWINGS

The embodiments of the present invention may be more completely understood in consideration of the following detailed description of various embodiments in connection with the accompanying drawings, in which.

While the present invention is amenable to various modifications and alternative forms, specifics thereof have been shown by way of example in the drawings and will be described in detail herein. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Referring to FIGS. 1-10, a post system 100 comprises, in an embodiment, cap 102 and base 104, wherein cap 102 operably couples to base 104. In an embodiment, cap 102 generally comprises superior disk 106, cap housing 108, and a locking mechanism 110. Superior disk 106 includes aperture 112 configured to operably couple locking mechanism 110. Superior disk 106 further comprises one or more apertures 114 for operably coupling superior disk 106 to cap housing 108. Superior disk 106 further comprises top surface 116 wherein top surface 116 can comprise any suitable contour, including, but not limited to, the central portion of top surface 116 being superior to, or inferior to, the outer portion of top surface 116 creating a concave or convex disk. Superior disk 106 further comprises bottom surface 118, wherein bottom surface 118 can comprise any suitable contour, including, but not limited to, the central portion of bottom surface 118 being superior to, or inferior to, the outer portion of bottom surface 118 creating a concave or convex disk. In an embodiment bottom surface 118 is flat. In another embodiment, bottom surface 118 matches top surface 116.

Superior disk 106 further comprises lip 120 wherein lip 120 can embody any suitable height and may be in any suitable form such that superior disk 106 can comprise a disc of varying thickness, depending on the application or embodiment. In an embodiment, lip 120 is a closed curve wherein superior disk 106 forms a circular, oval, or other like disk. In a further embodiment lip 120 is a polygon wherein disk 106 forms a triangle, square, rectangle, or other like disk.

Figure 1:
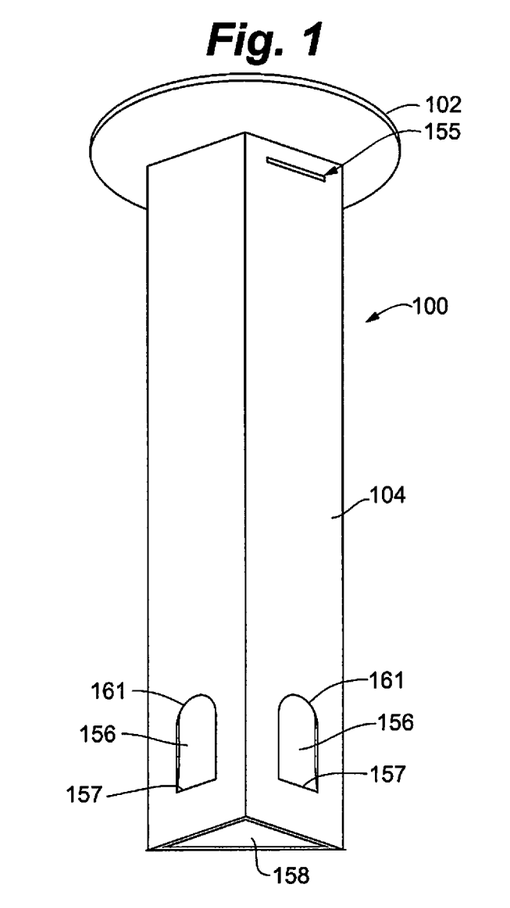
FIG. 1 is a perspective view of post system according to an embodiment.
Figure 2:
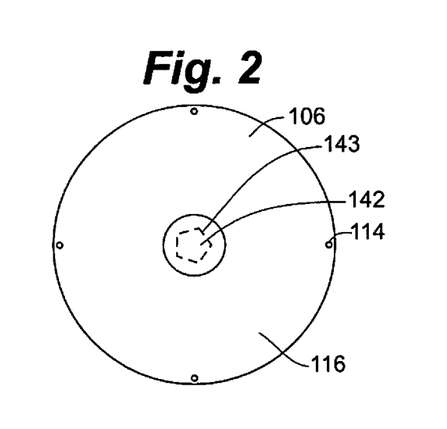
FIG. 2 is a top view of the post system.
Figure 3:
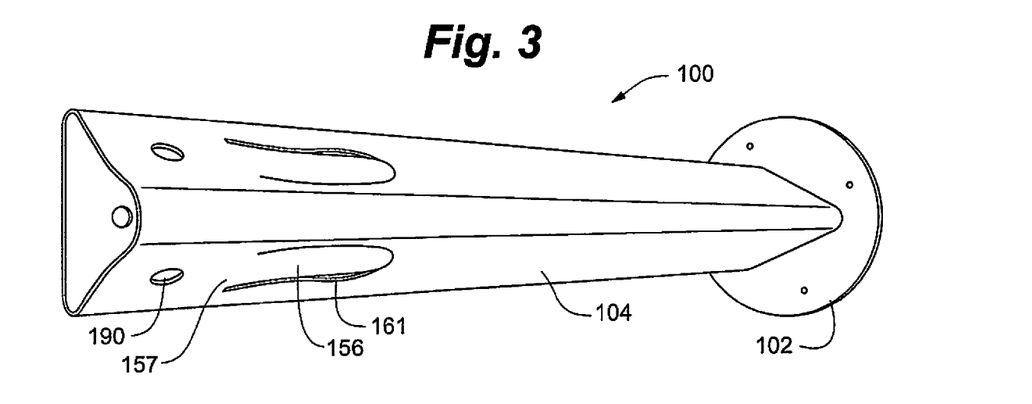
FIG. 3 is a perspective view from the base of the post system.
Figure 4:
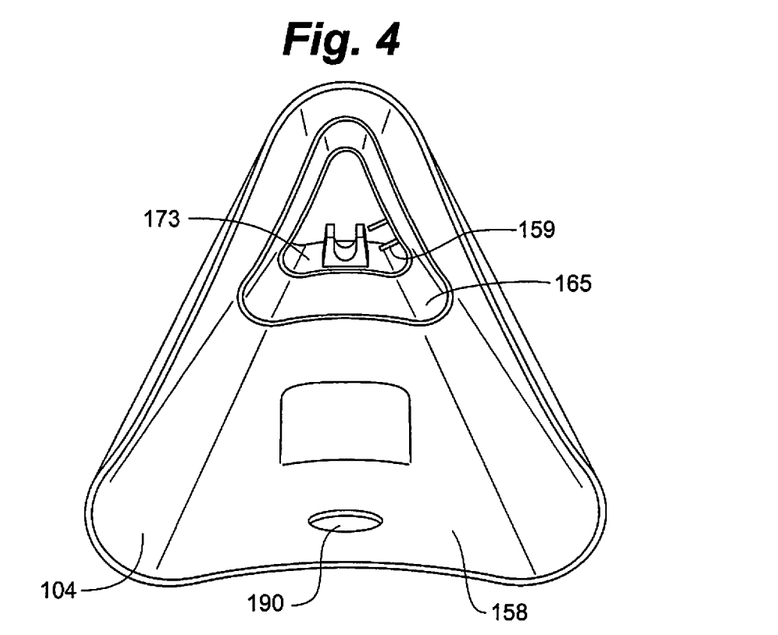
FIG. 4 is a perspective view showing the interior of the base housing and telescoping arms, of an embodiment.
Figure 5:
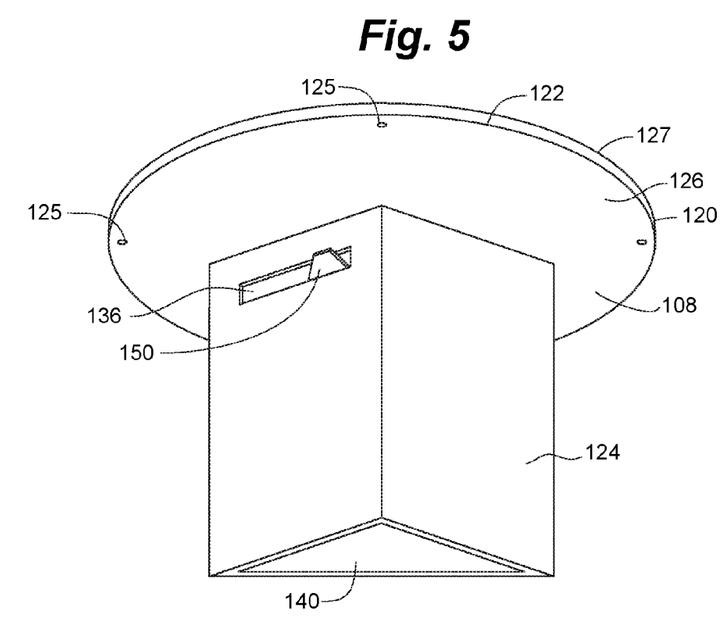
FIG. 5 is a perspective view of the cap.
Figure 6:
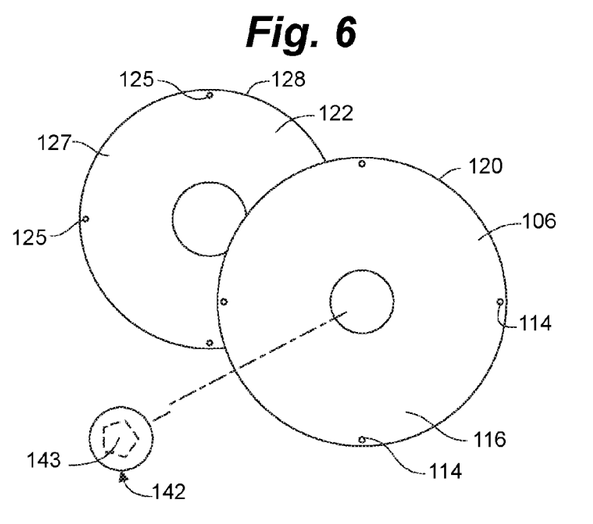
FIG. 6 is a plan view showing the lock bolt, the receiving disk and the superior disk of the cap.

Referring specifically to FIGS. 5 and 6, cap housing 108 comprises receiving disk 122 and casing 124, wherein receiving disk 122 is configured to receive superior disk 106, and casing 124 is configured to receive elements of base 104. In an embodiment, receiving disk 122 can include an aperture configured to operably couple locking mechanism 110. Receiving disk 122 further comprises one or more openings 125 configured to operably couple cap housing 108 to superior disk 106. Receiving disk 122 further comprises top surface 127 wherein top surface 127 can comprise any suitable contour, including, but not limited to, the central portion of top surface 127 being superior to, or inferior to, the outer portion of top surface 127 creating a concave or convex disk. Receiving disk 122 further comprises bottom surface 126, wherein bottom surface 126 can comprise any suitable contour, including, but not limited to, the central portion of bottom surface 126 being superior to, or inferior to, the outer portion of bottom surface 126 creating a concave or convex disk. In an embodiment, bottom surface 126 is flat. In a further embodiment, bottom surface 126 matches top surface 127.

Receiving disk 122 further comprises lip 128 wherein lip 128 can comprise any suitable height and may be in any suitable form. In an embodiment lip 128 is a closed curve wherein receiving disk 122 forms a circular or other like disk. In a further embodiment lip 128 is a polygon wherein superior disk 106 forms a triangle, square, rectangle, or other like disk. In an embodiment, surfaces 118, 127, and 128 are flat.

Casing 124 comprises aperture 136, and channel 140. Aperture 136 is configured to receive locking arm 150. In an embodiment casing 124 is a closed curve wherein casing 124 forms a circular, oval, or other like tube. In a further embodiment casing 124 is a polygon wherein casing 124 forms a triangular, square, rectangular, or other like tube. The circumference, in the case of a closed curve, or the perimeter, in the case of a polygon, of casing 124 is such that channel 140 configured to receive components of base 104, as will be described.

Figure 7:
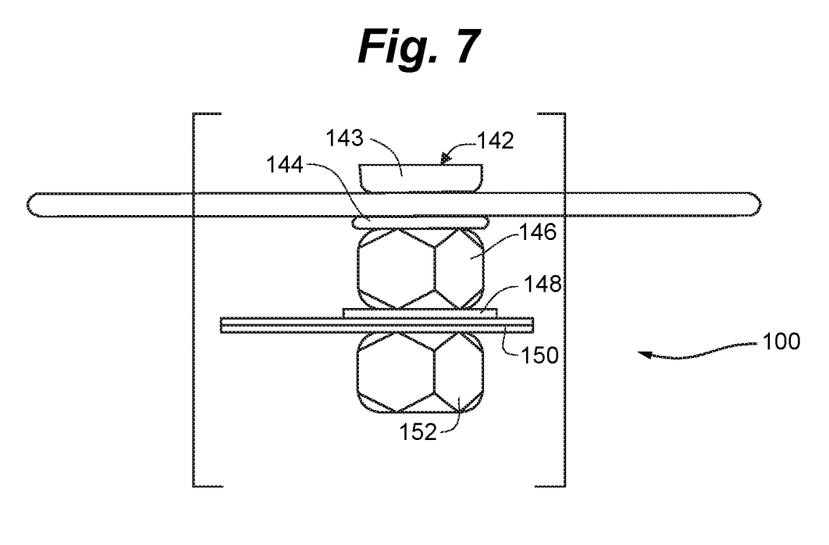
FIG. 7 is a sectional view of a locking mechanism of a cap, of an embodiment.

Referring to FIG. 7, locking mechanism 110 comprises bolt 142, bolt cap 143, washer 144, nut 146, washer 148, locking arm 150, and nut 152. Locking mechanism 110 is assembled by passing bolt 142 through aperture 112 and the aperture of receiving disk 122 so that bolt cap 143 rests of top surface 116. Washer 144 is then placed onto bolt 142, followed by nut 146, washer 148, locking arm 150, and finally nut 152. Locking mechanism 110 is configured to allow a user to fasten cap 102 to base 104 by allowing user to manipulate or turn bolt cap 143 thereby causing locking arm 150 to pass through aperture 136 and aperture of base 104, as will be described.

Referring to FIG. 7, locking mechanism 110 comprises bolt 142 (not shown), bolt cap 143, washer 144, nut 146, washer 148, locking arm 150, and nut 152. Locking mechanism 110 is assembled by passing bolt 142 through aperture 112 and the aperture of receiving disk 122 so that bolt cap 143 rests of top surface 116. Washer 144 is then placed onto bolt 142, followed by nut 146, washer 148, locking arm 150, and finally bolt 152. Locking mechanism 110 is configured to allow a user to fasten cap 102 to base 104 by allowing user to manipulate or turn bolt cap 143 thereby causing locking arm 150 to pass through aperture 136 and aperture of base 104, as will be described.

Figure 8:
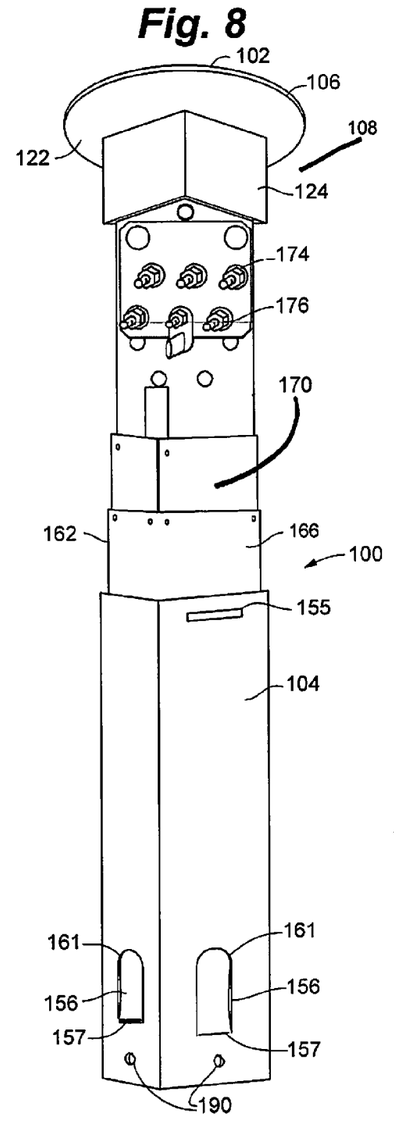
FIG. 8 is a perspective view of the housing base with cap attached, of an embodiment.
Figure 9:
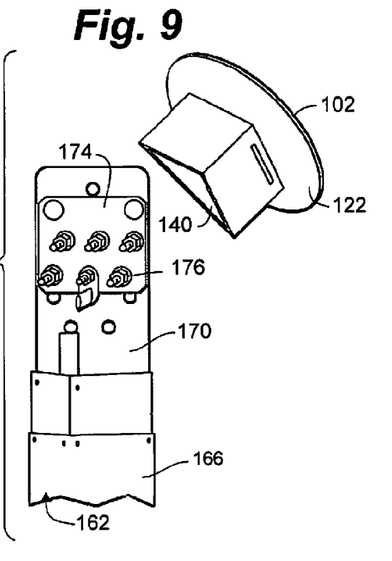
FIG. 9 is a perspective view of the internal telescoping arms with cap removed.
Figure 10:
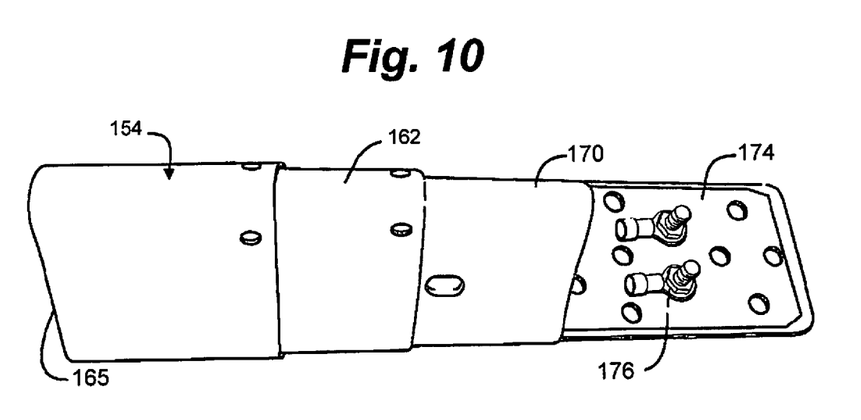
FIG. 10 is a perspective view of the internal telescoping arms.
Figure 11:
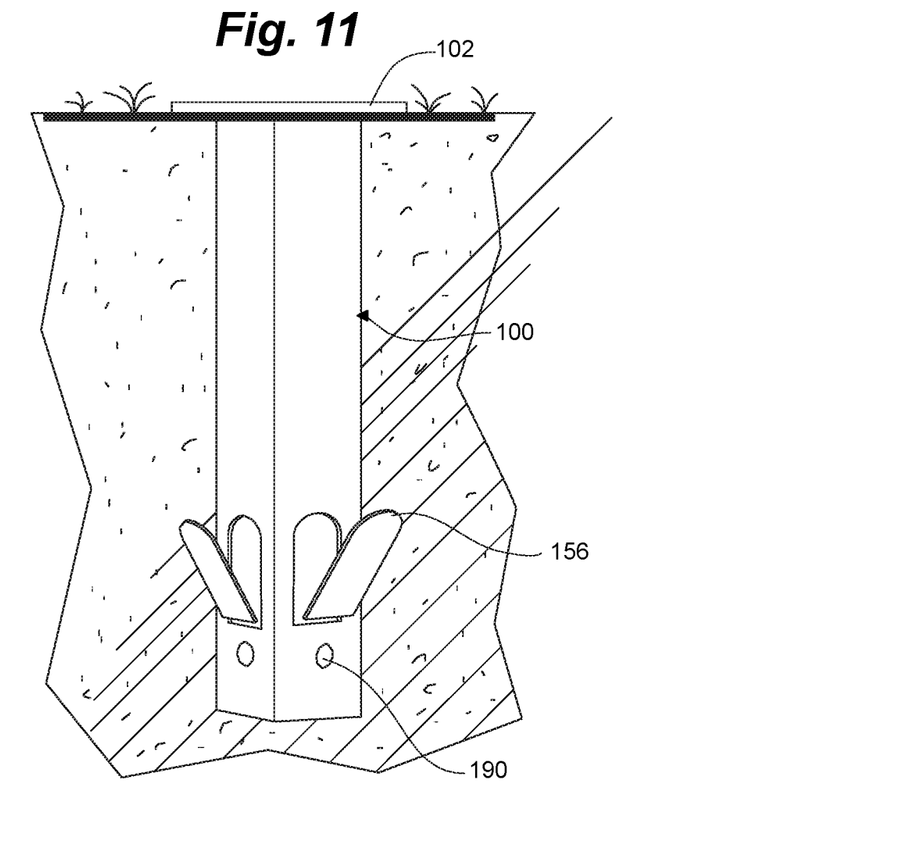
FIG. 11 is a perspective view of the present invention placed in the ground.

Referring generally to FIG. 8-10, base 104 generally comprises base housing 154, first internal telescoping arm 162, and second internal telescoping arm 170.

Referring specifically to FIG. 8, in an embodiment base housing 154 can comprise aperture 155, anchoring wings 156, channel 158, and aperture 163. Aperture 155 is configured to accept locking arm 150 when post system 100 is locked. Anchoring wings 156 are elements of base housing 154 articulated at joint 157 and free of base housing 154 throughout their perimeter 161, so that anchoring wings 156 are rotated distal to housing 154. When in use, as illustrated in FIG. 10, anchoring wings 156 function as a security feature and are configured to prevent post system 100 from being pulled from the ground. As post system 100 is pulled in an upward direction using, as an example, cap 102, anchoring wings 156 engage their surrounding, as an example, soil, and prevent post system 100 from being pulled from the environment in which post system 100 has been installed. Though depicted as curved in FIG. 5 anchoring wings 156 can comprise any suitable shape or configuration depending upon the application or use of post system 100. Base housing 154 may also include access holes 190 for tracer wire or utilities.

Channel 158 is configured to accept first internal telescoping arm 162. Lower internal stop 159 is internal to housing 154. In an embodiment lower internal stop 159 may be a single flange or other protuberance that partially block aperture 163. In the alternative, internal stop 159 maybe a lip that runs the circumference, in the case of a closed curve, of aperture 163. Lower internal stop 159 is configured to provide a stop for first internal telescoping arm 162 so that when installed or in transport first internal telescoping arm 162 will not slide through aperture 163. It is envisioned that other stops could be inserted into aperture 163 to prevent internal telescoping arms from being removed out of the top of the base housing.

In an embodiment, base housing 154 is a closed curve wherein base housing 154 forms a circular, oval, or other like tube. In a further embodiment housing 154 is a polygon wherein housing 154 forms a triangular, square, rectangular, or other like tube. The circumference, in the case of a closed curve, or the perimeter, in the case of a polygon, of housing 154 is such that channel 158 is configured to receive first internal telescoping arm 162.

Referring specifically to FIGS. 9 and 10, first internal telescoping arm 162 includes channel 165, lower section 164, and upper section 166.

In an embodiment, first internal telescoping arm 162 is a closed curve wherein first internal telescoping arm 162 forms a circular, oval, or other like tube. In a further embodiment first internal telescoping arm 162 is a polygon wherein first internal telescoping arm 162 forms a triangular, square, rectangular, or other like tube. In an embodiment the circumference, in the case of a closed curve, 162 is such that channel 165 is configured to accept second internal telescoping arm 170. In another embodiment the perimeter, in the case of a polygon, of first internal telescoping arm 162 is such that channel 165 is configured to accept second internal telescoping arm 170. Lower section 164 is fastened to upper section 166. Lower section 164 has a greater cross sectional area then upper section 166 so that there is a staggered outside dimension to first internal telescoping arm 162.

Second internal telescoping arm 170 in includes channel 173, terminal board 174, and anchoring slots 176. Second internal telescoping arm 170 slidingly engages first internal telescoping arm 162. Second internal telescoping arm 170 is disposed within channel 165 of the first internal telescoping arm.

In an embodiment, terminal board 174 is mounted to second internal telescoping arm 170 at a first end and extends axially from second internal telescoping arm 170. In an embodiment, terminal board 174 is an exposed internal flat, in the case of a polygon, surface of second internal telescoping arm 170 wherein anchoring slots 176 are located. Anchoring slots 176 serve to provide a location for connecting, in one embodiment, a tracer wire to terminal board 174, and may be in any shape or diameter depending on the application or embodiment.

In an embodiment, second internal telescoping arm 170 is a closed curve wherein internal second internal telescoping arm 170 forms a circular, oval, or other like tube. In a further embodiment first internal telescoping arm 162 is a polygon wherein second internal telescoping arm 170 forms a triangular, square, rectangular, or other like tube. The circumference, in the case of a closed curve, is such that channel 165 is configured to accept second internal telescoping arm 170. The perimeter, in the case of a polygon, of second internal telescoping arm 170 is such that channel 165 is configured to accept second internal telescoping arm 170.

In operation, assembly of post system 100 can comprise, inserting first internal telescoping arm 162 into aperture 155 of base housing 154, inserting second internal telescoping arm 170 into aperture 167 of first internal telescoping arm 162 thereby forming base 104, operably coupling superior disk 102 to receiving disk 122, operably coupling internal locking mechanism 110 to superior disk 102 and receiving disk 122 thereby forming cap 102, and operably coupling cap 102 to base 104 wherein base 124 of cap 102 is inserted into aperture 155 of base housing 154 thereby forming post system 100.

In operation, installation of post system 100 can comprise, forming a void by, as an example, digging hole in the ground, inserting base 104 into the void, securing base 104 within the void by, as an example, packing dirt around base 104, coupling cap 102 to base 104 as described above, and locking cap 102 to base 104 as described above.

What is claimed is:

1. A post system for use in marking and accessing an underground utility, said post system comprising: a cap and a base, wherein the post system is disposed with the cap flush with a ground and the base projecting into the ground above the underground utility;

the cap comprises a superior disk, a cap housing, and a locking mechanism; wherein the superior disk is attached to the cap housing, said cap housing slidingly overlapping the base, the superior disk overlaps the cap housing to form a ground engaging flange from which the base hangs within;

the locking mechanism having a rotatable locking arm, the locking mechanism accessible from an upper surface of the superior disk while the base projects into the ground, said rotatable locking arm operably connected to a bolt so that rotation of the bolt rotates the rotatable locking arm through an aperture in the cap housing to engage an aperture in the base so that when the rotating arm is in a locked position the cap cannot be removed from the base, said locking arm and aperture in the cap housing positioned under the ground;

the base comprises a base housing, a first internal telescoping arm, and a second internal telescoping arm, wherein the base housing, the first internal telescoping arm, and the second internal telescoping arm having a broader base cross section than a top cross section;

wherein the base housing defines an internal channel, said internal channel of the base housing accepts the first internal telescoping arm, said first internal telescoping arm defining a first telescoping arm channel, the channel of the first internal telescoping arm accepts the second internal telescoping arm;

said second internal telescoping arm including a mounting plate, said mounting plate extending distally in a fixed position to the second internal telescoping arm, wherein a length of the second internal telescoping arm and the mounting plate are less than a length of the base housing;

and wherein, the cap can be removed so that the mounting plate can be raised as the second internal telescoping arm extends axially from the first internal telescoping arm and the first internal telescoping arm extends axially from the base housing, said base housing including at least one stop to prevent the first internal telescoping arm and second internal telescoping arm from dropping out of a bottom of the base housing, the first internal telescoping arm and second internal telescoping arm free to travel independently within the limits of the stops.

2. The post system of claim 1, comprising a top surface of the superior disk, said top surface selected from the group consisting of flat, concave, and convex.

3. The post system of claim 1, comprising a bottom surface of the superior disk selected from the group consisting of flat, concave, and convex.

4. The post system of claim 1, wherein the locking mechanism includes a first washer, a first nut, a second washer, the rotatable locking arm, and a second nut.

5. The post system of claim 1, wherein the cap housing, the first internal telescoping arm, and the second internal telescoping arm have an external perimeter shape selected from the group consisting of a triangle, a triangle with curved corners, and a polygon.

6. The post system of claim 1, wherein the base housing includes at least one ground engaging anchoring wing, said wing is articulated to the housing and configured to be positioned distal to the housing.

7. The post system of claim 1, wherein the base housing further comprises a stop that protrudes into the internal channel so as to position the first internal telescoping arm.

8. The post system of claim 7 wherein the stop also positions the second internal telescoping arm.

9. The post system of claim 1, wherein the first internal telescoping arm includes a lower section and an upper section, said lower section with a greater cross sectional area so that the upper section can be inserted into the lower section thus providing a staggered exterior shape.

10. The post system of claim 1, wherein the mounting plate comprises anchoring slots for operably coupling a trace wire that runs through the open center of the post system to an underground utility.

* * * * *